(12) United States Patent
Carrillo Fernandez et al.

(10) Patent No.: US 11,572,011 B1
(45) Date of Patent: Feb. 7, 2023

(54) VEHICLE FRONT END ASSEMBLY HAVING FROND BUMPER FASCIA AND HEADLAMP STRUCTURE ATTACHED TO VEHICLE FRAME

(71) Applicant: Nissan North America, Inc., Franklin, TN (US)

(72) Inventors: Omar Fernando Carrillo Fernandez, Toluca (MX); Md Hafizur Rahman, Troy, MI (US); Diego Armando Salinas Ceballos, Toluca (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/463,445

(22) Filed: Aug. 31, 2021

(51) Int. Cl.
*B60Q 1/04* (2006.01)
*B60R 19/02* (2006.01)

(52) U.S. Cl.
CPC ......... *B60Q 1/0441* (2013.01); *B60Q 1/0433* (2013.01); *B60R 19/023* (2013.01)

(58) Field of Classification Search
CPC .................................................. B60Q 1/0408
See application file for complete search history.

(56) References Cited

U.S. PATENT DOCUMENTS

| | | | |
|---|---|---|---|
| 8,128,139 B2 * | 3/2012 | Stoffel | B60Q 1/045 362/546 |
| 9,539,934 B2 * | 1/2017 | Fortin | B60R 19/52 |

\* cited by examiner

*Primary Examiner* — Robert J May
(74) *Attorney, Agent, or Firm* — Global IP Counselors, LLP

(57) ABSTRACT

A vehicle front end assembly includes a front portion of a vehicle frame structure. A bumper fascia is attached to the front portion of the vehicle frame structure. Further, a headlamp structure is attached to both the front portion of the vehicle frame structure and the bumper fascia.

14 Claims, 13 Drawing Sheets

US 11,572,011 B1

VEHICLE FRONT END ASSEMBLY HAVING FROND BUMPER FASCIA AND HEADLAMP STRUCTURE ATTACHED TO VEHICLE FRAME

BACKGROUND

Field of the Invention

The present invention generally relates to a vehicle front end assembly. More specifically, the present invention relates to attachments between elements of a front end assembly including attachments between a headlamp structure, a fender, a bumper fascia and a front grill.

Background Information

The bumper fascia at the front end of vehicles serves many purposes including providing an attractive appearance to the front of a vehicle, covering and concealing bumper assembly elements and having sufficient flexibility and resiliency to absorb impact energy from low speed impacts.

SUMMARY

One object of the present disclosure is to provide a bumper fascia with an attachment location at a lower end of an inboard section of a headlamp structure in order to add attachment support to a central area of the bumper fascia.

Another object of the present disclosure is to prevent or limit sagging of a central area of a bumper fascia after a low speed impact event.

Another object of the present disclosure is to provide an attachment structure adjacent to a central area of a bumper fascia with a frangible wall that absorbs low speed impact energy without damaging an adjacent headlamp structure.

Yet another object of the present disclosure is to provide an attachment structure adjacent to a central area of a bumper fascia in order to give additional support to a radar unit installed to a rear portion of a front grill that is installed to the bumper fascia.

In view of the state of the known technology, one aspect of the present disclosure is to provide a vehicle front end assembly with a front portion of a vehicle frame structure, a bumper fascia attached to the front portion of the vehicle frame structure and a headlamp structure that is attached to the front portion of the vehicle frame structure and the bumper fascia.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
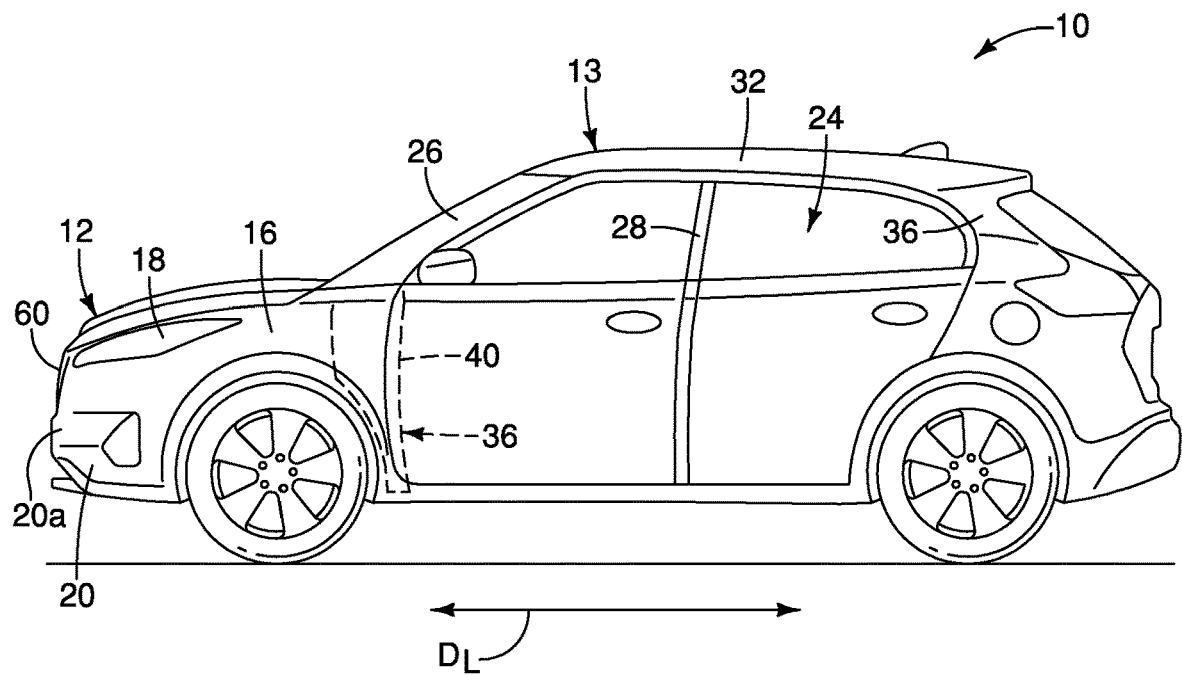
FIG. 1 is a side view of a vehicle having a front end assembly in accordance with a first embodiment.
Figure 2:
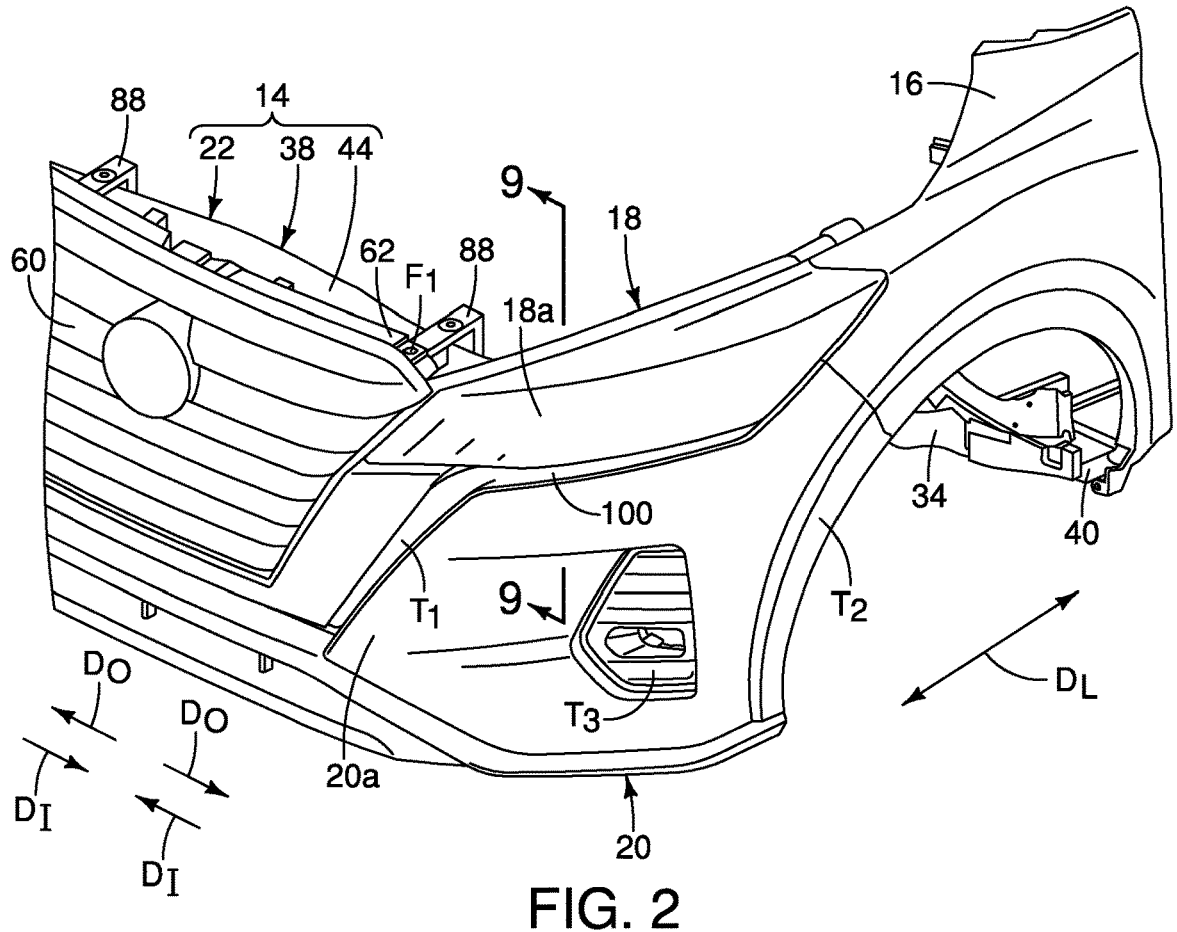
FIG. 2 is perspective view of front and side portions the front end assembly removed from the vehicle showing a fender, a headlamp structure, a bumper fascia and a front grill in accordance with the first embodiment.
Figure 3:
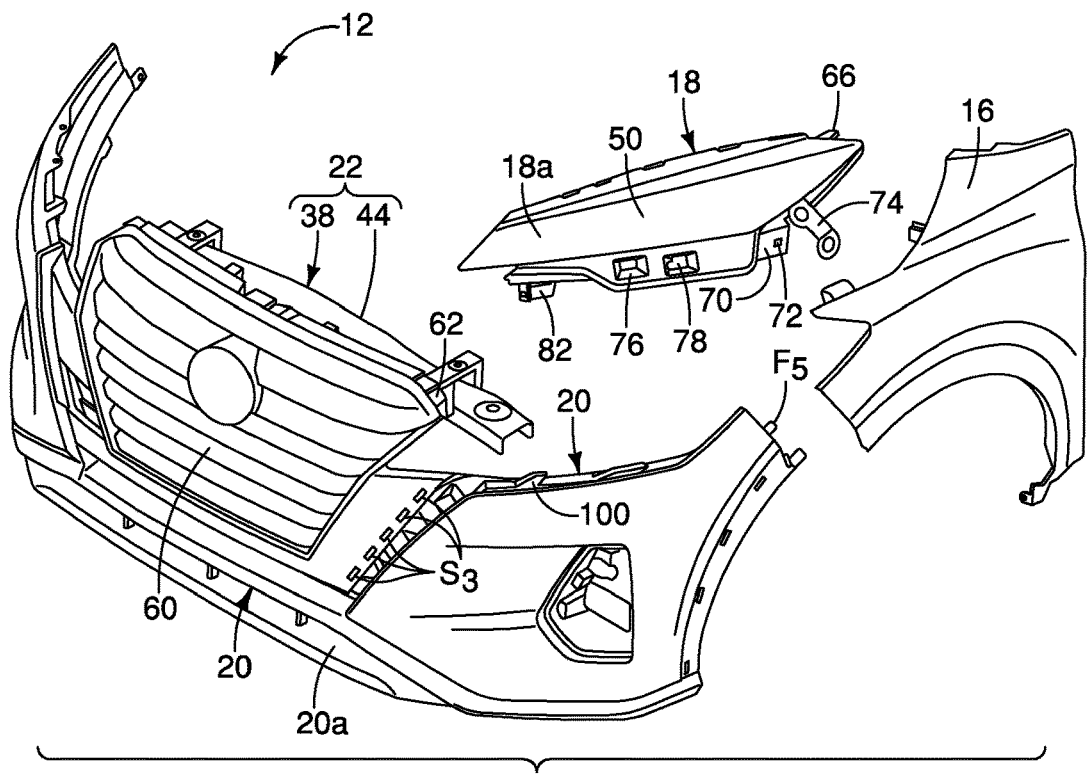
FIG. 3 is an exploded perspective view of the front and side portions the front end assembly removed from the vehicle showing the fender, the headlamp structure, the bumper fascia and the front grill separated from one another in accordance with the first embodiment.

Referring initially to FIG. 1, a vehicle 10 that includes a front end assembly 12 is illustrated in accordance with a first embodiment. As shown in FIG. 2, the front end assembly 12 of the vehicle 10 includes, among other component and features, a vehicle body structure 13, a vehicle frame structure 14, a fender 16, a headlamp structure 18 and a bumper fascia 20. The front end assembly 12 further includes trim element $T_1$ that is installed between the headlamp structure 18 and the fender 16, a trim element $T_2$ that adorns the front wheel well of the fender 16 and a trim element $T_3$ that either covers a fog lamp opening or is a fog lamp lens.

As shown in FIGS. 1 and 2, the vehicle 10 defines a lengthwise direction $D_L$, inboard directions $D_I$ and outboard directions $D_O$. The inboard directions $D_I$ and the outboard directions $D_O$ are defined relative to a center line (not shown) of the vehicle 10 that extends parallel to the lengthwise direction $D_L$ of the vehicle 10.

The vehicle frame structure 14 is part of the vehicle body structure 13, portions of which are depicted in FIGS. 2 and 5-7. Specifically, various elements of a front portion 22 of the vehicle frame structure 14 are shown in FIGS. 2, 5, 6 and 7, and described herein below. The vehicle body structure 13 includes elements that define a passenger compartment 24. Specifically, as shown in FIG. 1, the passenger compartment 24 is defined by an A-pillar 26, a B-pillar 28, a C-pillar 30, a roof structure 32 and the front portion 22 of the vehicle frame structure 14, in addition to other features not shown such as a floor structure.

The front portion 22 of the vehicle frame structure 14 includes a pair of front side members 34 (only one front side member 34 is shown in FIGS. 2 and 4-7). The front side members 34 are frame elements that extend forward from the passenger compartment 24.

The vehicle body structure 13 can be a frame/chassis design or can be part of a unibody vehicle body design. In a frame/chassis design, the frame structure 14 includes beams and cross-members that are welded together to define a support structure with the structures of the passenger compartment 24 being fixed thereto by, for example, mechanical fasteners. In a unibody design, the elements that define the passenger compartment 24 also serve as structural elements such that a convention frame structure is not necessary. Rather, frame elements, such as the front side members 34 can extend from and optionally under predetermined sections of the passenger compartment 24 and are welded thereto.

In the depicted embodiment, the vehicle body structure 13 is a unibody vehicle design. Consequently, the front side members 34 extend forward from the passenger compartment 24 providing support for an engine and transmission (not shown), the fenders 16, the headlamp structure 18 and the bumper fascia 20, along with numerous other elements and components such as those associated with the engine, air conditioning system and other conventional vehicle accessories.

The front end assembly 12 has a first lateral side and a second lateral side, each having their own respective fender 16 and headlamp structure 18, and frame elements such as the front side member 34. Since the fenders 16 and the headlamp structure 18 are identical on the two sides of the vehicle 10 and the front end assembly 12 (except that they are mirror images of one another) description of one side applies equally to the opposite side. Similarly, the bumper fascia 20 has a first lateral side and a second lateral side that are symmetrical mirror images of one another. Since the two lateral sides of the bumper fascia 20 are basically the same (mirror images of one another), description of one side applies equally to the opposite side. Hence, only one side of the front end assembly 12 (and of the vehicle 10) is described hereinbelow for the sake of brevity.

The front portion 22 of the vehicle frame structure 14 includes, among other features, the front side member 34, a fender support structure 36 and a radiator support structure 38. In the vehicle 10, there are two front side members 34. Only one of the front side members 34 is shown and described herein below for the sake of brevity. However, it should be understood from the drawings and the description herein that there are two front side members 34 that are identical to one another, except that they are symmetrical mirror images of one other. One of the front side members 34 is located on the driver's side of the vehicle 10 and the other front side member 34 is located on the passenger's side of the vehicle 10. The two front side members 34 are approximately parallel to one another except for various curves and contours formed thereon.

Figure 4:
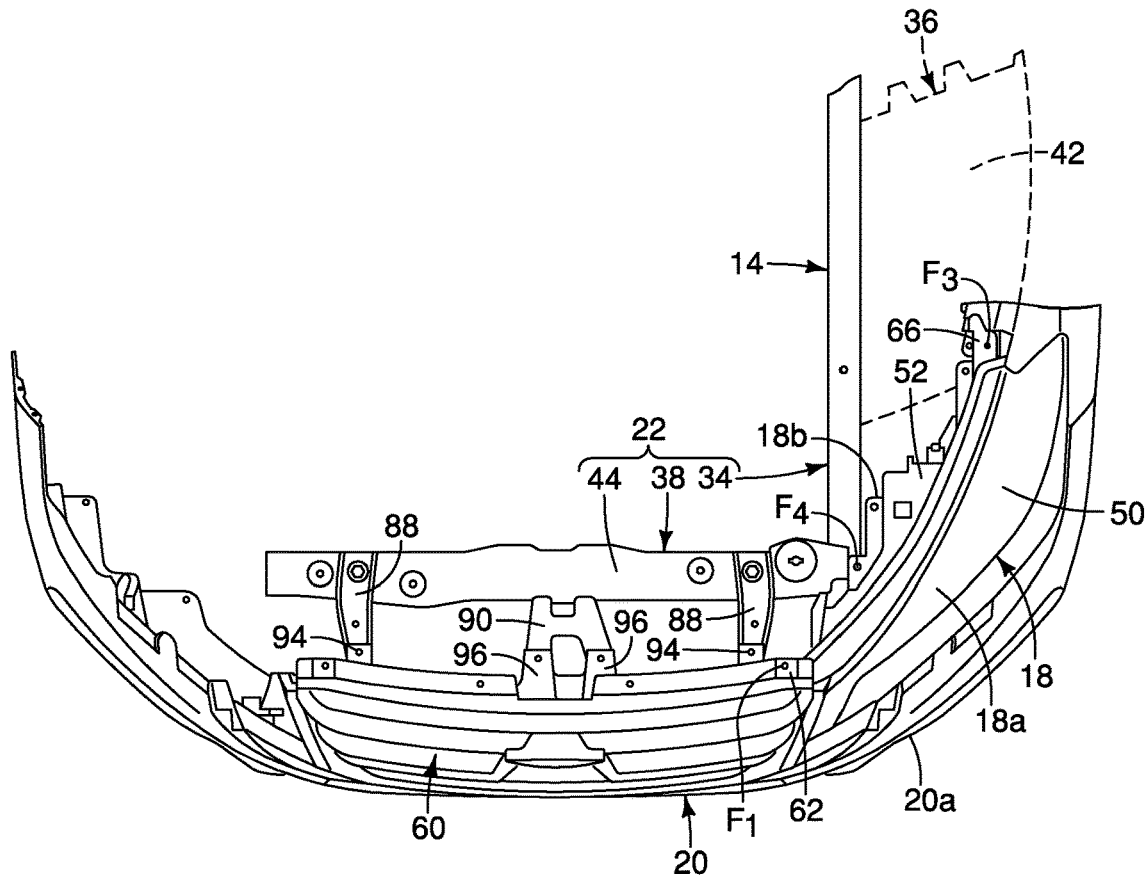
FIG. 4 is a top view of the front end assembly removed from the vehicle showing the fender, the headlamp structure, the bumper fascia, the front grill and elements of a front portion of a vehicle frame structure of the vehicle such as a front side member, a fender support structure and a radiator support structure in accordance with the first embodiment.
Figure 5:
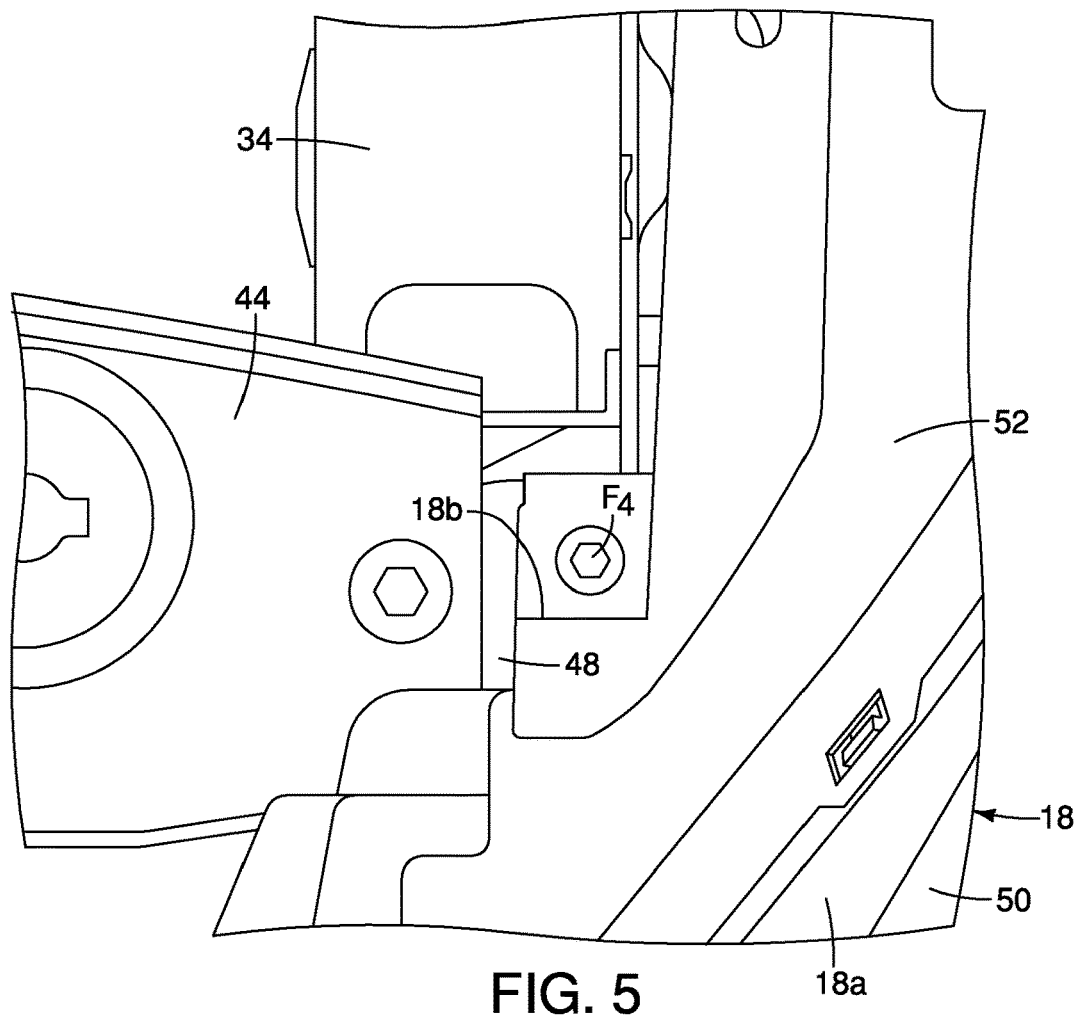
FIG. 5 is a top view of an area of the front end assembly showing attachment between the radiator support portion and the front side member and attachment between the headlamp and the radiator support structure in accordance with the first embodiment.
Figure 6:
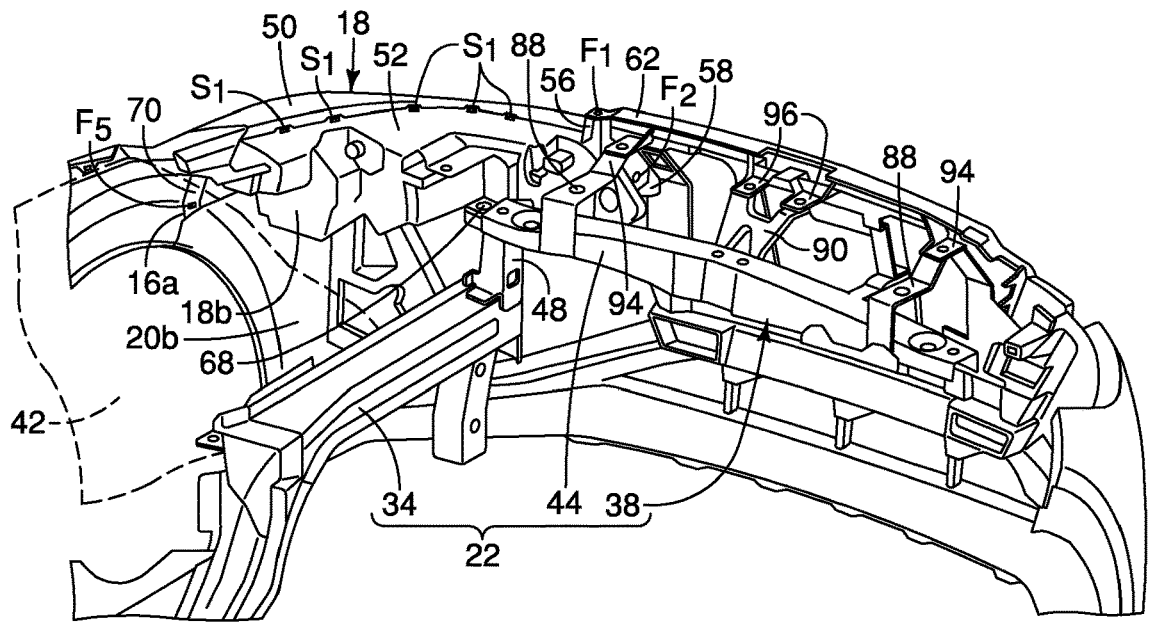
FIG. 6 is a rear perspective view of the front end assembly showing rearward facing surfaces of the headlamp assembly and the bumper fascia showing the attachment between the radiator support portion and the front side member and the attachment between the headlamp and the radiator support structure in accordance with the first embodiment.

The fender support structure 36 includes structural elements 40 and structural elements 42. The structural element 40 extend downward from the A-pillar 26 and inboard from the front side member 34, as shown in FIGS. 1 and 2. The structural element 42 extends forward from the passenger compartment 24 above the front side member 34, as shown in FIGS. 4 and 6.

The radiator support structure 38 is a laterally oriented structure at a forward upper end of the front portion 22 that is shaped and configured to support a radiator (not shown) connected to the cooling system (not shown) of an engine (not shown) of the vehicle 10. The radiator support structure 38 includes an upper panel 44 that extends perpendicular to the lengthwise direction $D_L$ of the vehicle 10. The upper panel 44 is shown in FIGS. 2-7. As shown in FIG. 6, the upper panel 44 is connected to an upper area of a front end of the front side member 34 via a support bracket 48. More specifically, the upper panel 44 is fixedly attached to the support bracket 48 via, for example, mechanical fasteners or welding techniques. The support bracket 48 is fixedly attached to the forward end of the front side member 34 by welding techniques, or alternatively by mechanical fasteners (not shown).

The fender 16 is attached to at least the structural elements 40 of the vehicle body structure 13 (FIG. 1) and the structural element 42 (FIG. 6), as well as other elements described further below. The fender 16 can include various shaped and contours surface portions but otherwise is a conventional vehicle component. Hence, further description is omitted for the sake of brevity.

Figure 11:
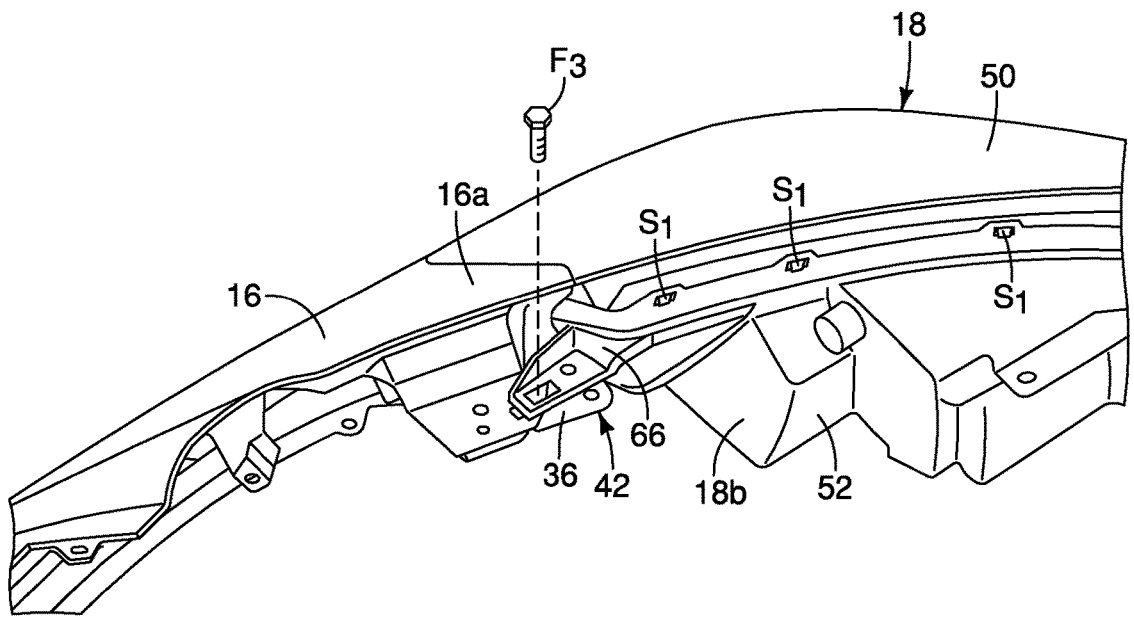
FIG. 11 is a rear perspective view of an upper forward area of the fender and an upper rearward area of the headlamp structure showing attachment between the fender and the headlamp structure in accordance with the first embodiment.

The headlamp structure 18 includes a lens 50 and a housing 52 (also referred to as a headlamp housing 52). The lens 50 defines a forward facing surface 18a of the headlamp structure 18 and the housing 52 defines a rearward facing surface 18b of the headlamp structure 18. The lens 50 is a transparent element that allows light produced light producing elements (not shown) within housing 52. The housing 52 defines a partially hollow interior with the lens 50 with lighting elements installed therein. The lens 50 is attached to the housing 52 by any of a variety of attachment designs, such as adhesive material(s) and/or a plurality of fastener elements such as snap fitting projections $S_1$ shown in FIGS. 6-7 and 11.

The housing 52 includes a plurality of attachment points in order to install the headlamp structure 18 to the front portion 22 of the vehicle frame structure 14, the fender 16 and the bumper fascia 20, as described below.

Figure 12:
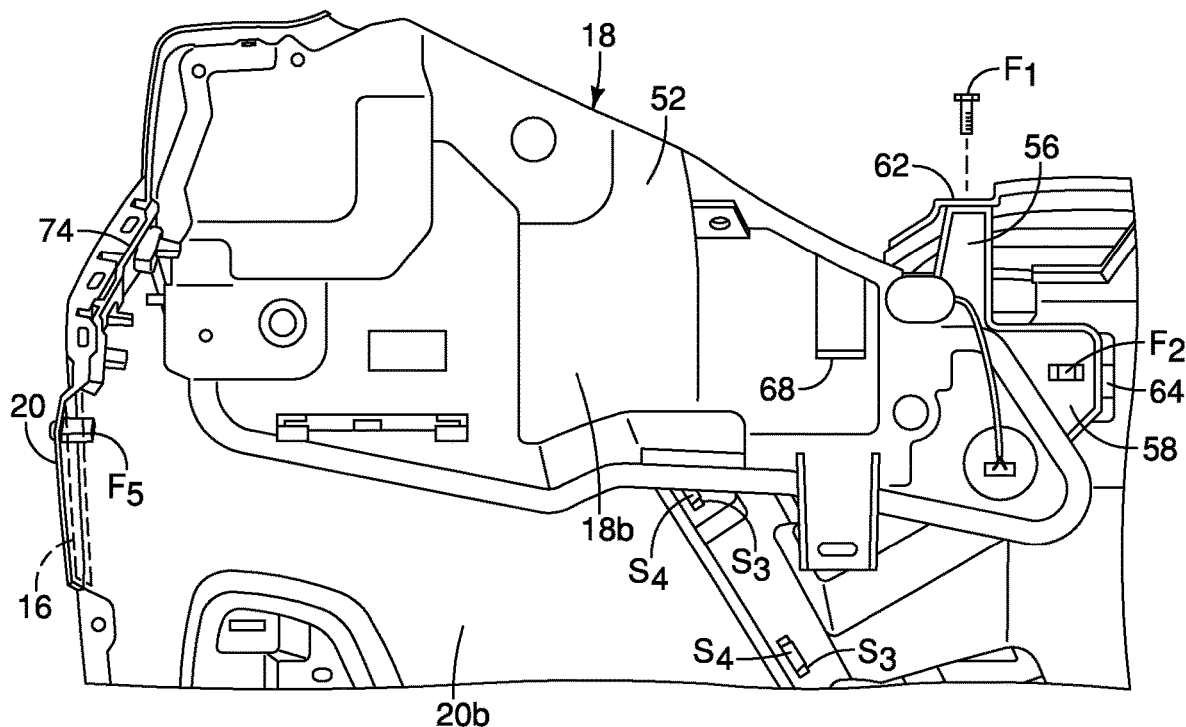
FIG. 12 is a rear view of the headlamp structure and a portion of the bumper fascia showing a fender bracket attached to the bumper fascia and a rear view of a first doghouse of the headlamp structure in accordance with the first embodiment.
Figure 13:
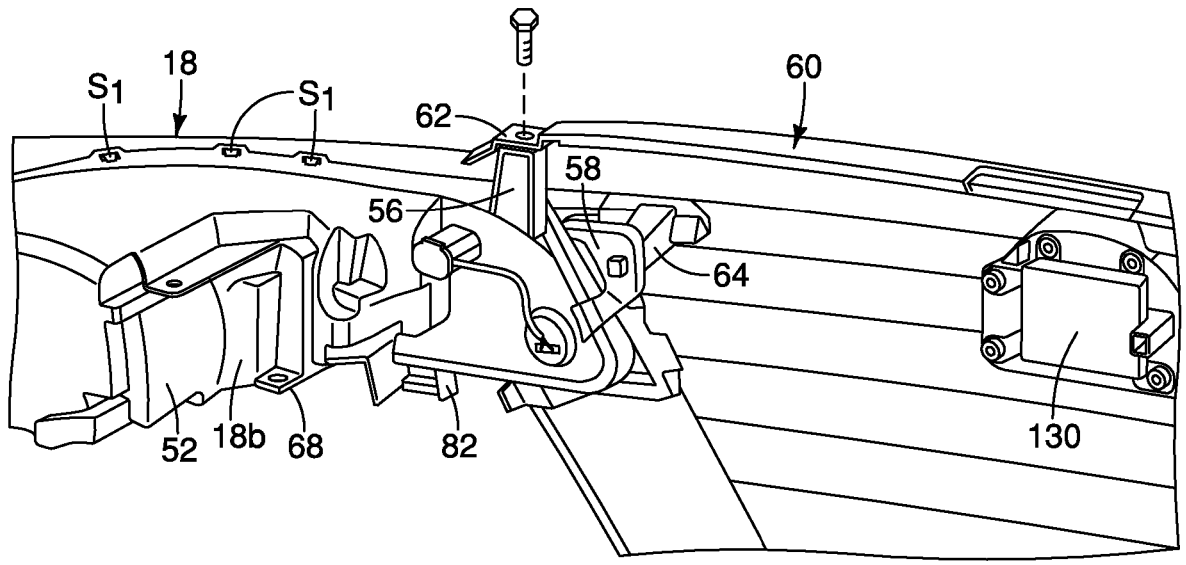
FIG. 13 is a rear perspective view of an inboard portion of the headlamp structure and a portion of the front grill showing the first doghouse attachment between the front grill and the headlamp structure in accordance with the first embodiment.

As shown in FIGS. 6, 7, 11-13, the housing 52 of the headlamp structure 18 includes an upwardly extending flange 56 and an inboard extending flange 58 that connect via fasteners $F_1$ and $F_2$ to a front grill 60 (described in greater detail below) of the bumper fascia 20. More specifically, the upper surface of the upwardly extending flange 56 includes an aperture and an upper surface of an upper portion 62 (a first location) of the front grill 60 includes another aperture that receives the fastener $F_1$. The fastener $F_1$ is also visible in FIGS. 2 and 4. The fastener $F_2$ is a snap fitting fastener that extends rearwardly from an attachment portion 64 (a second location) of the front grill 60 and snap fits into an opening in the inboard extending flange 58 of the housing 52, as shown in FIG. 13.

Figure 7:
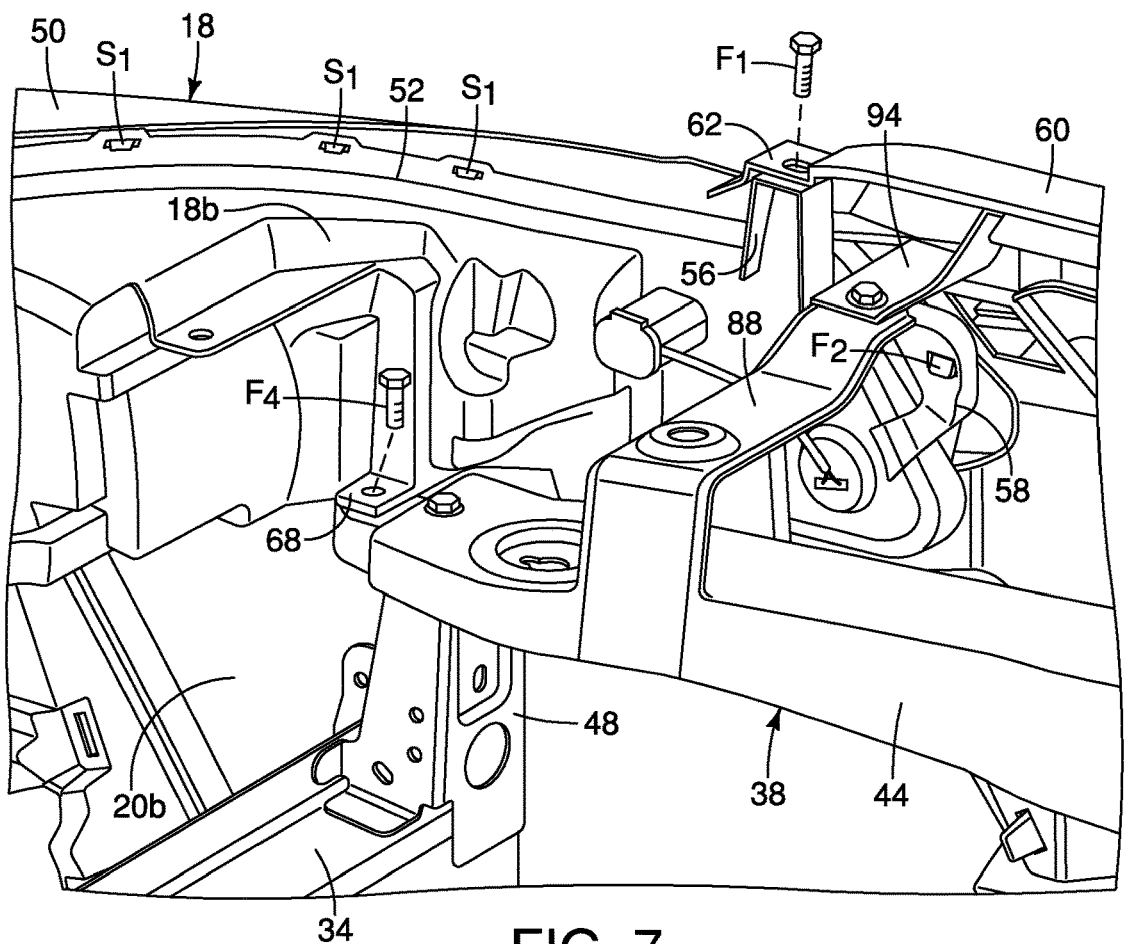
FIG. 7 is another rear perspective view of a portion the front end assembly showing rearward facing surfaces of the headlamp assembly and the bumper fascia and also showing the attachment between the radiator support portion and the front side member and the attachment between the headlamp and the radiator support structure in accordance with the first embodiment.
Figure 8:
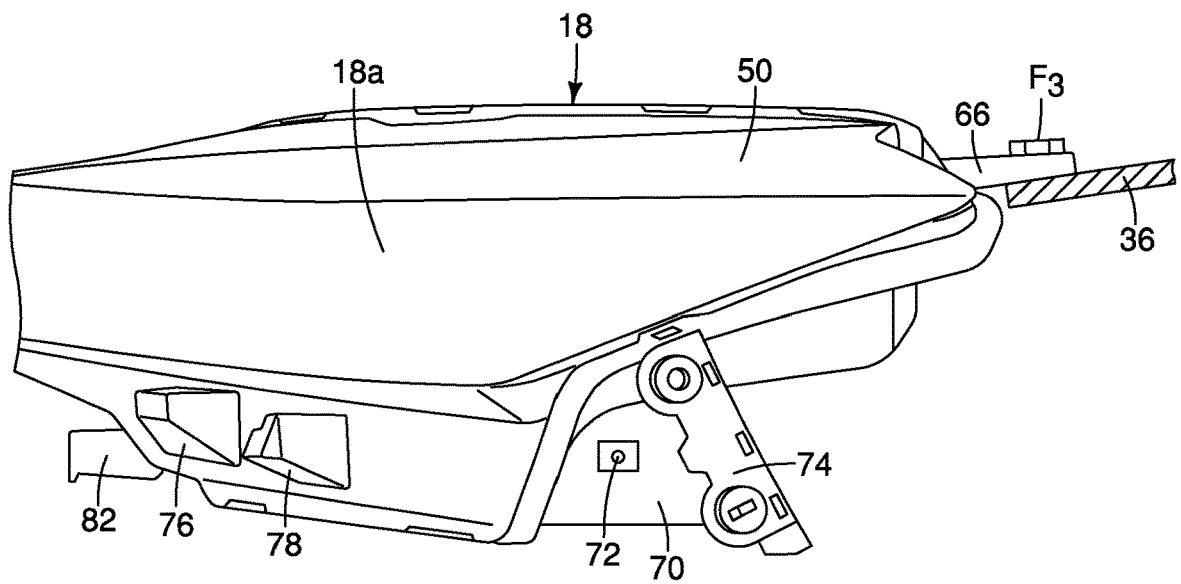
FIG. 8 is a side view of the headlamp assembly and a forward end of a section of a fender support structure in accordance with the first embodiment.
Figure 9:
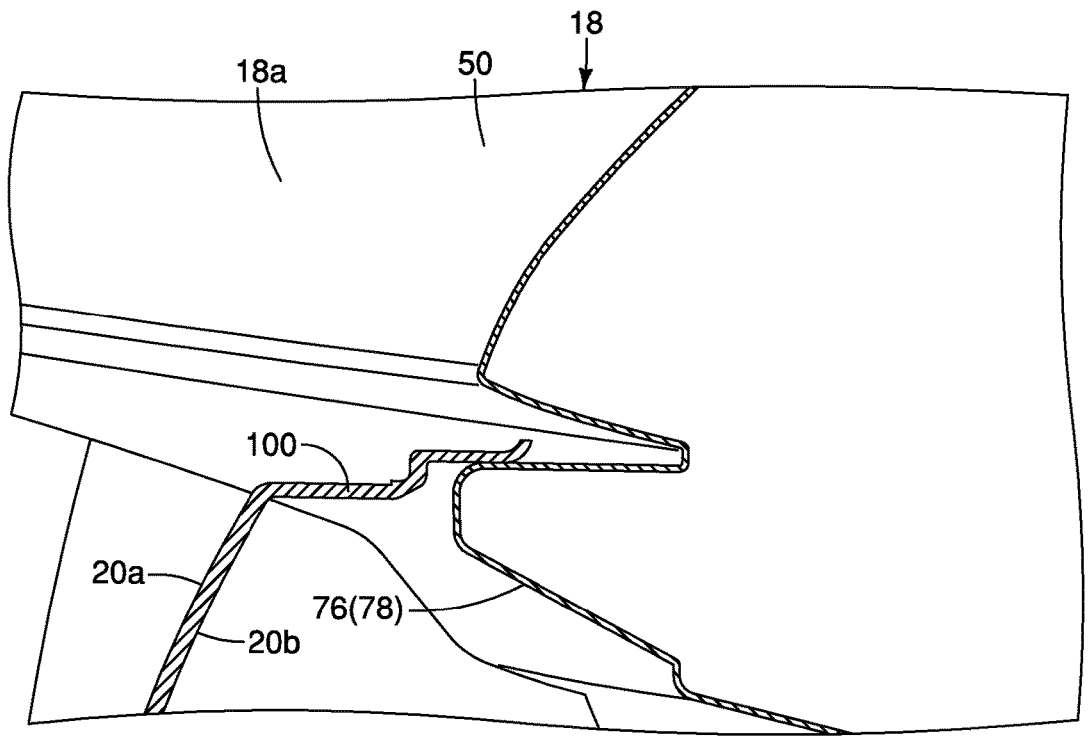
FIG. 9 is a cross-sectional side view of the headlamp structure 18 and a portion of the bumper fascia showing an upper flange of the bumper fascia being supported on protrusions extending from the headlamp structure in accordance with the first embodiment.

Further, the housing 52 of the headlamp structure 18 includes a rearwardly extending flange 66 that is fixedly attached to the structural element 42 of the fender support structure 36 via a fastener $F_3$, as shown in FIGS. 4 and 8. The housing 52 also includes a rearwardly extending flange 68 located along an inboard section of the rear of the housing 52. The rearwardly extending flange 68 attaches to the support bracket 48 via a fastener $F_4$, as shown in FIGS. 4, 6 and 7. The support bracket 48 is installed to an upper forward end of the front side member 34 (part of the vehicle frame structure 14) and partially defines the radiator support structure 38, as shown in FIGS. 6 and 7.

The housing 52 further includes a rearwardly extending side flange 70 shown in FIGS. 6 and 8 with an opening 72 that aligns with a corresponding opening (not shown) defined by a forward section 16a (FIG. 6) of the fender 16 via a fastener (not shown. A fender bracket 74 overlays a portion of the side flange 70 and attaches to the bumper fascia 20, as described further below.

The lens 50 of the headlamp structure 18 has forwardly extending protrusions 76 and 78, as shown in FIGS. 3, 8-9 and 14. The function of the protrusions 76 and 78 is described below.

A lower inboard area of the housing 52 of the headlamp structure 18 includes a first doghouse structure 82 that is located below the lens 50 and is defined below a main section of the housing 52, as shown in FIGS. 3, 8, 12-15 and 19-24. More specifically, the first doghouse structure 82 is located below a lower surface of a main section of the headlamp structure 18. The first doghouse structure 82 is at a location proximate a lower inboard area of the headlamp housing 52. As described further below, the bumper fascia 20 includes a second doghouse structure 84 that is at a location that aligns with the first doghouse structure 82 with the bumper fascia 20 properly installed to the vehicle 10. More specifically, the second doghouse structure 84 and the first doghouse structure 82 align such that a snap-fitting projection $S_2$ installed to the second doghouse structure 84 attaches to the first doghouse structure 82, as described in greater detail below.

Figure 16:
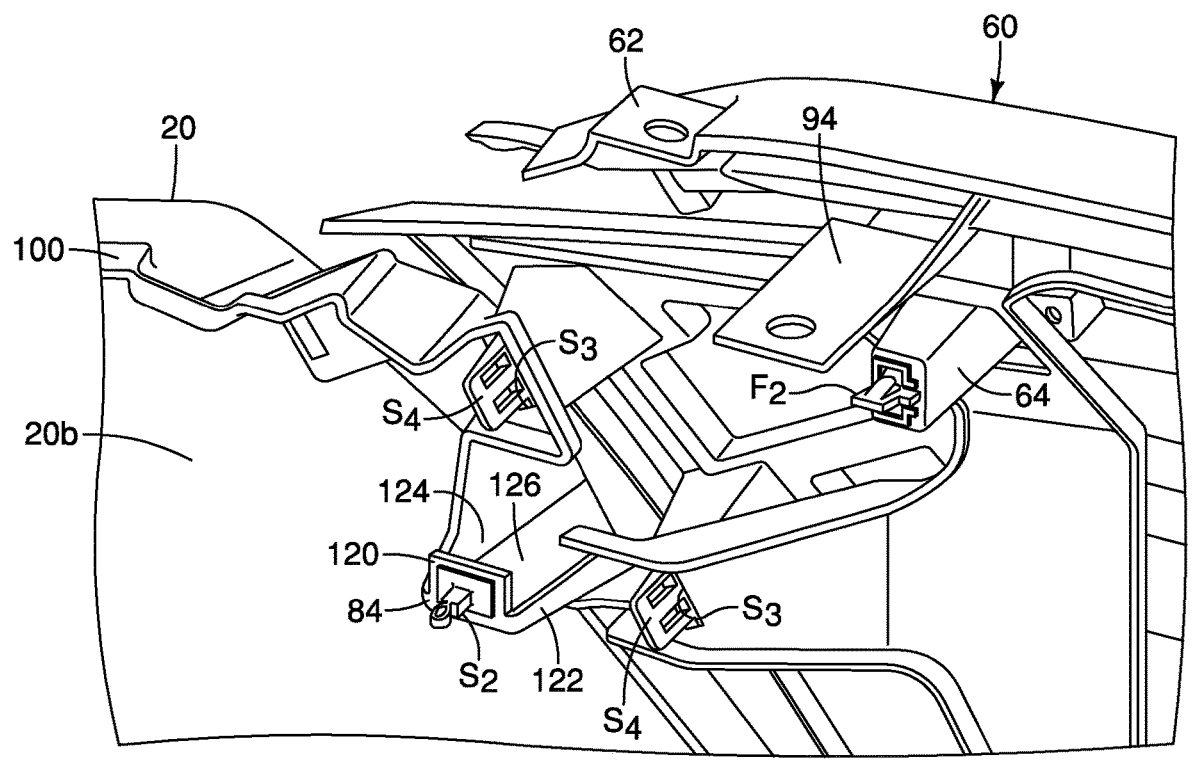
FIG. 16 is a rear perspective view of the bumper fascia and front grill showing a second doghouse structure extending rearward from the bumper fascia in accordance with the first embodiment.

The bumper fascia 20 further includes the front grill 60 that overlays a central area of a forward facing surface 20a of the bumper fascia 20 and is attached thereto. The bumper fascia 20 includes a plurality of slots $S_3$ (FIGS. 3, 12 and 16) that each receive a corresponding one of a plurality of snap fitting projections $S_4$ formed on a rearward surface of the front grill 60, as shown in FIGS. 12 and 16.

The bumper fascia 20 is part of a bumper assembly that includes at least a beam or bracket (not shown) attached to forward ends of the front side member 34 and one or more impact energy absorbing members (not shown) attached to the beam or bracket. Since bumper assemblies are conventional vehicle structures, further description is omitted for the sake of brevity.

The bumper fascia 20 is shaped and designed in accordance with the design of the vehicle 10. The overall shape of the bumper fascia 20 depicted in the drawings is one example of the overall shape of the bumper fascia 20. In other words, the bumper fascia 20 is not limited to the depicted shape and can have alternative shapes and contours.

The bumper fascia 20 is attached to the front portion 22 of the vehicle frame structure 14, the fender 16 and the headlamp structure 18 as described below.

Figure 10:
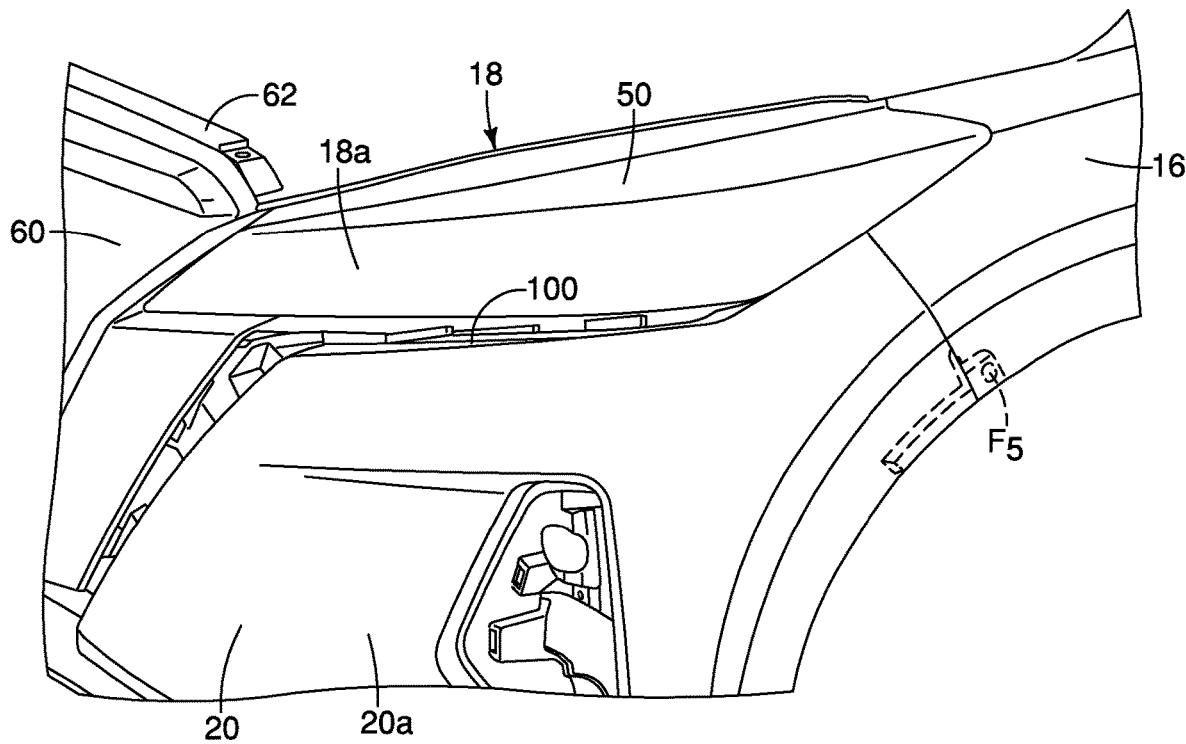
FIG. 10 is a side view of the headlamp structure 18 and the portion of the bumper fascia that defines the upper flange showing attachment between a rearward area of the bumper fascia and a forward area of the fender in accordance with the first embodiment.

As mentioned above, the fender bracket 74 overlays a portion of the side flange 70 of the housing 52 of the headlamp structure 18. An upper end of the fender bracket 74 is attached to the housing 52 of the headlamp structure 18. A lower end of the fender bracket 74 is attached to a forward end of the fender 16. A rearward end of the bumper fascia 20 is fixed to the forward end of the fender 16 at a location adjacent to the lower end of the fender bracket 74 by a fastener F₅ shown in FIGS. 6 and 10.

As shown in FIGS. 2-4 and 6-7, the upper panel 44 of the radiator support structure 38 includes two attachment brackets 88 and a central attachment bracket 90 that all extend forward from the upper panel 44. The attachment brackets 88 are located outboard of the central attachment bracket 90 and on opposite sides thereof. The front grill 60 includes two rearwardly extending attachment brackets 94 and two central attachment brackets 96, as shown in FIGS. 4, 6 and 7. The attachment brackets 94 attach to the brackets 88 of the upper panel 44 of the radiator support structure 38. The attachment brackets 96 attach to the attachment bracket 90 of the upper panel 44 of the radiator support structure 38.

The bumper fascia 20 also includes an upper flange 100 that is outboard of the front grill 60, as shown in FIGS. 2-3 and 9-10. The upper flange 100 extends rearwardly along a lower area of the lens 50 such that the upper flange 100 contacts upper surfaces of the protrusions 76 and 78, as shown in cross-section in FIG. 9. In other words, the bumper fascia 20 is at least partially supported by the protrusions 76 and 78 of the headlamp structure 18. However, the upper flange 100 is not fixedly attached to the protrusions 76 and 78, but rather rests upon the protrusions 76 and 78.

Figure 14:
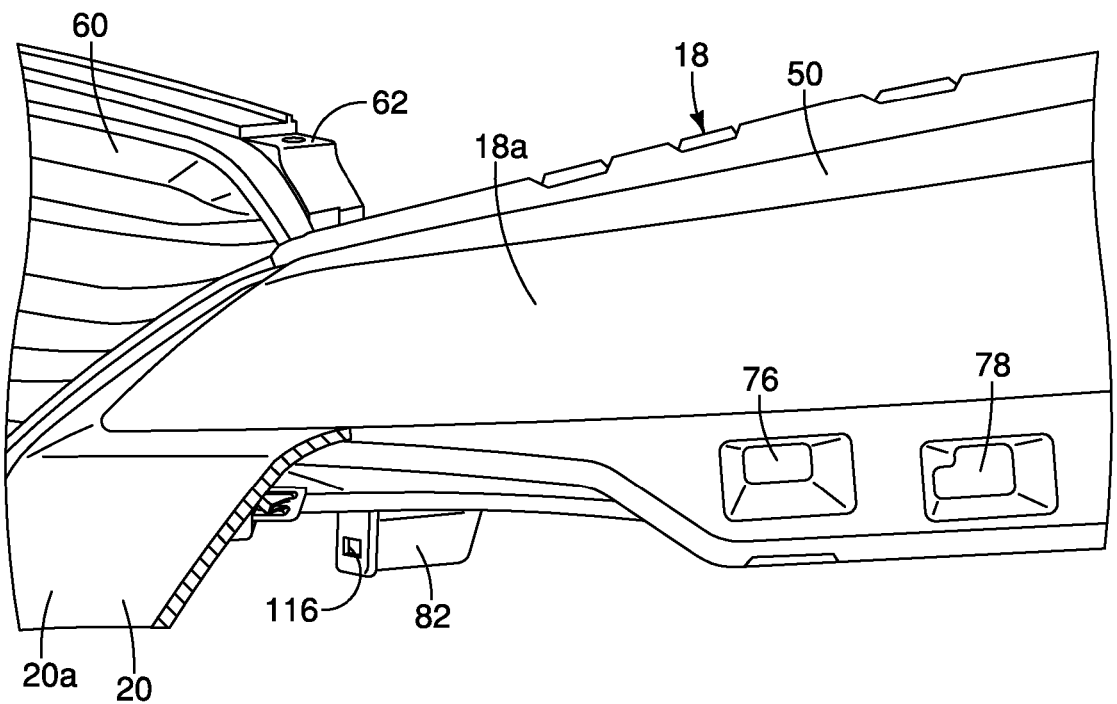
FIG. 14 is a part cut-away perspective view of the headlamp structure showing the first doghouse extending downward from the housing of the headlamp structure in accordance with the first embodiment.
Figure 15:
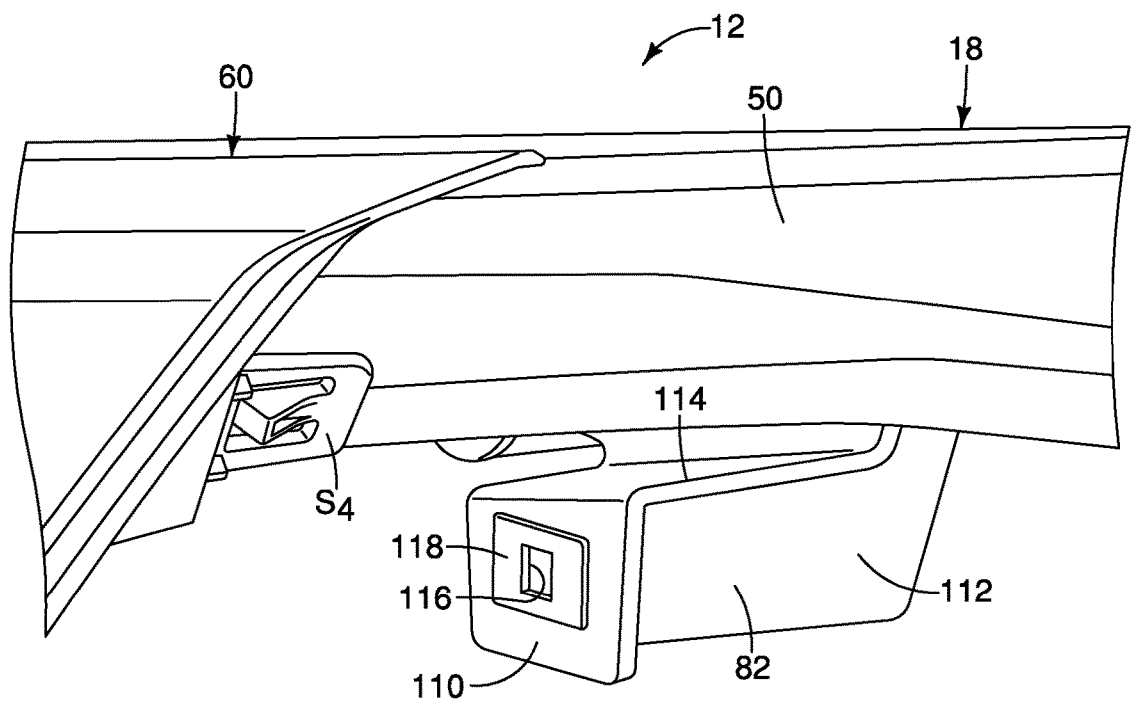
FIG. 15 is a perspective view of the headlamp structure showing the first doghouse in accordance with the first embodiment.
Figure 21:
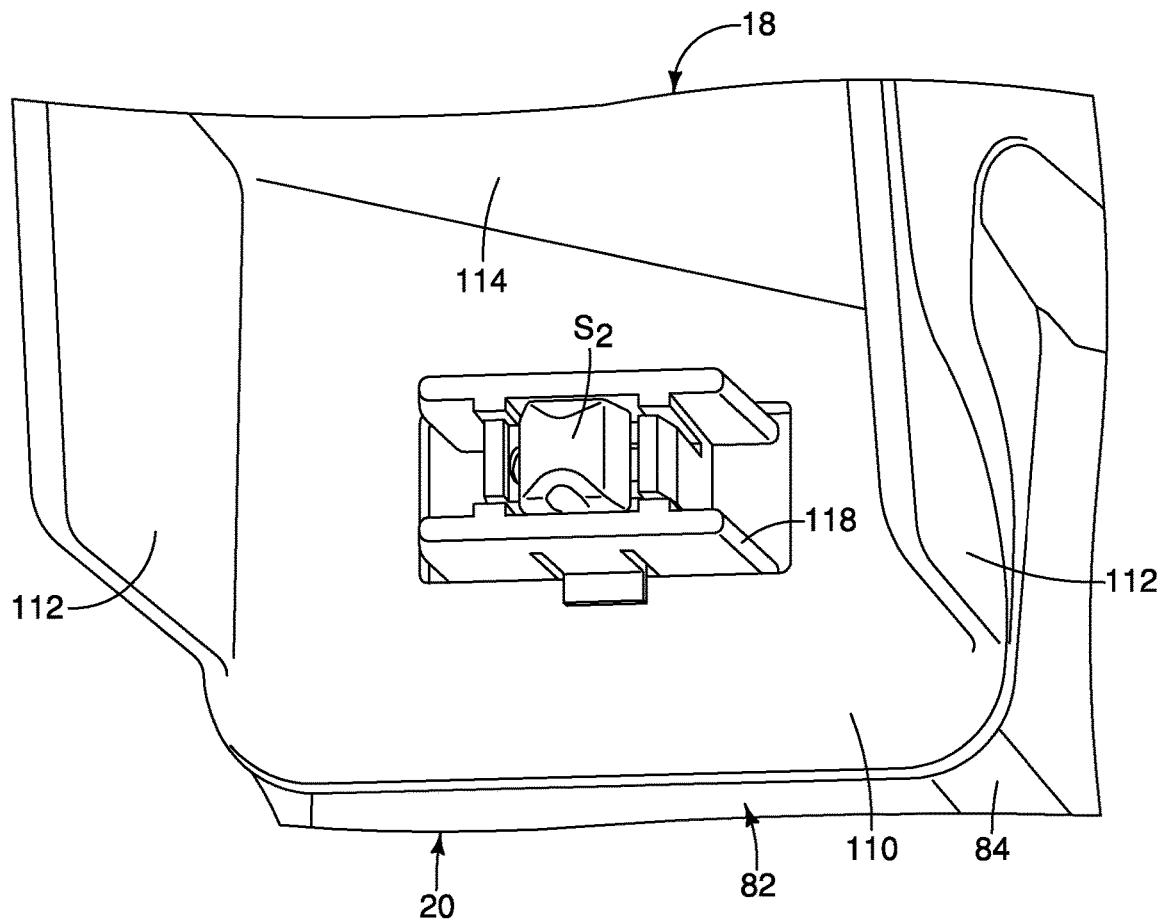
FIG. 21 is a rear perspective view of the first doghouse and second doghouse structure the first doghouse and second doghouse structure showing the snap fitting fastener of the second doghouse structure inserted into the first doghouse structure in accordance with the first embodiment.
Figure 22:
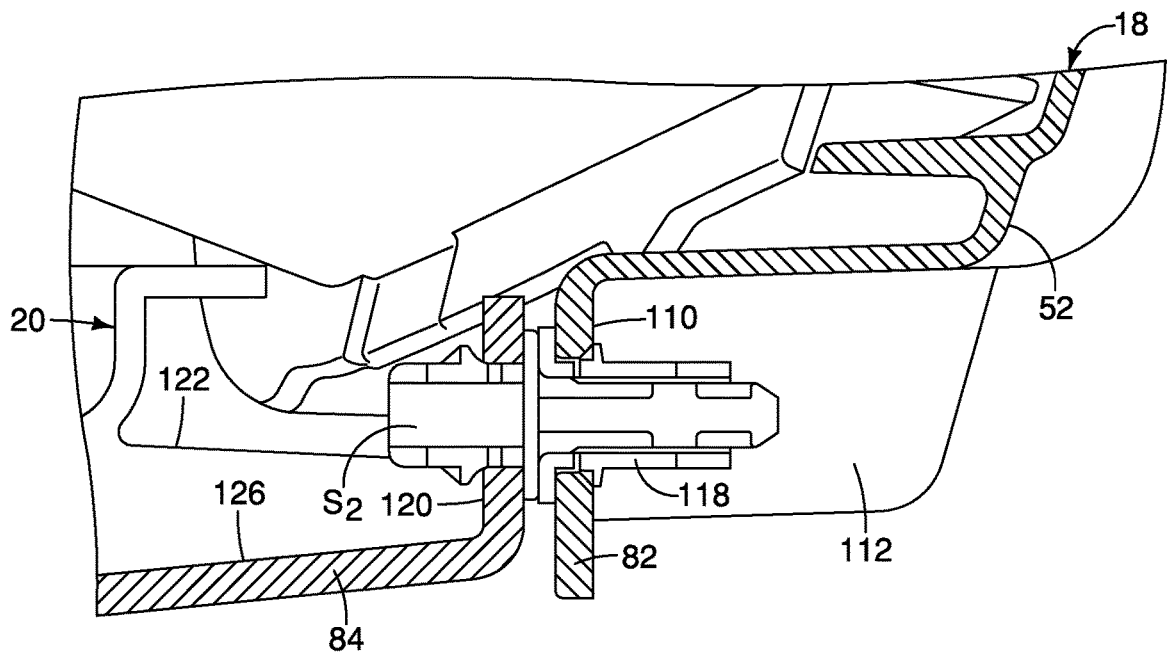
FIG. 22 is a cross-sectional view of the first doghouse and second doghouse structure taken along the line 22-22 in FIG. 20 showing the snap fitting fastener of the second doghouse structure inserted into the first doghouse structure in accordance with the first embodiment.
Figure 23:
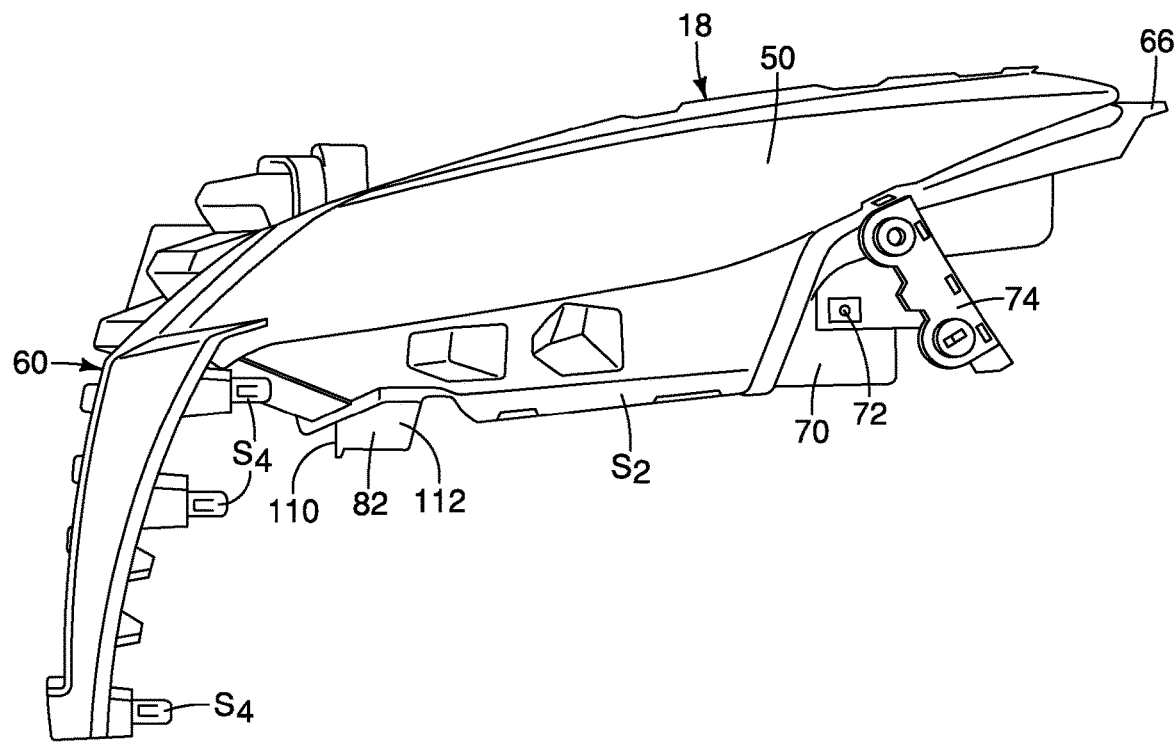
FIG. 23 is a side view of the headlamp structure and the front grill with the fender and bumper fascia removed showing the first doghouse structure in accordance with the first embodiment.

A description of the first doghouse structure 82 and the second doghouse structure 84 is now provided with specific reference to FIGS. 14-24. As shown in FIGS. 14-15 and 19-22, the first doghouse structure 82 is a partially enclosed structure with a front wall 110, side walls 112 and a top wall 114. The front wall 110 includes a slot 116. A fastener receiving insert 118 is installed within the slot 116, as shown in FIGS. 15 and 20-22. The side walls 112 extend downward to an area of the front wall 110 lower than the slot 116. As shown in FIGS. 14 and 15, the first doghouse structure 82 is located below a lower inboard area of the headlamp structure 18. As shown in FIGS. 21 and 22, the first doghouse structure 82 has an open bottom area.

Figure 17:
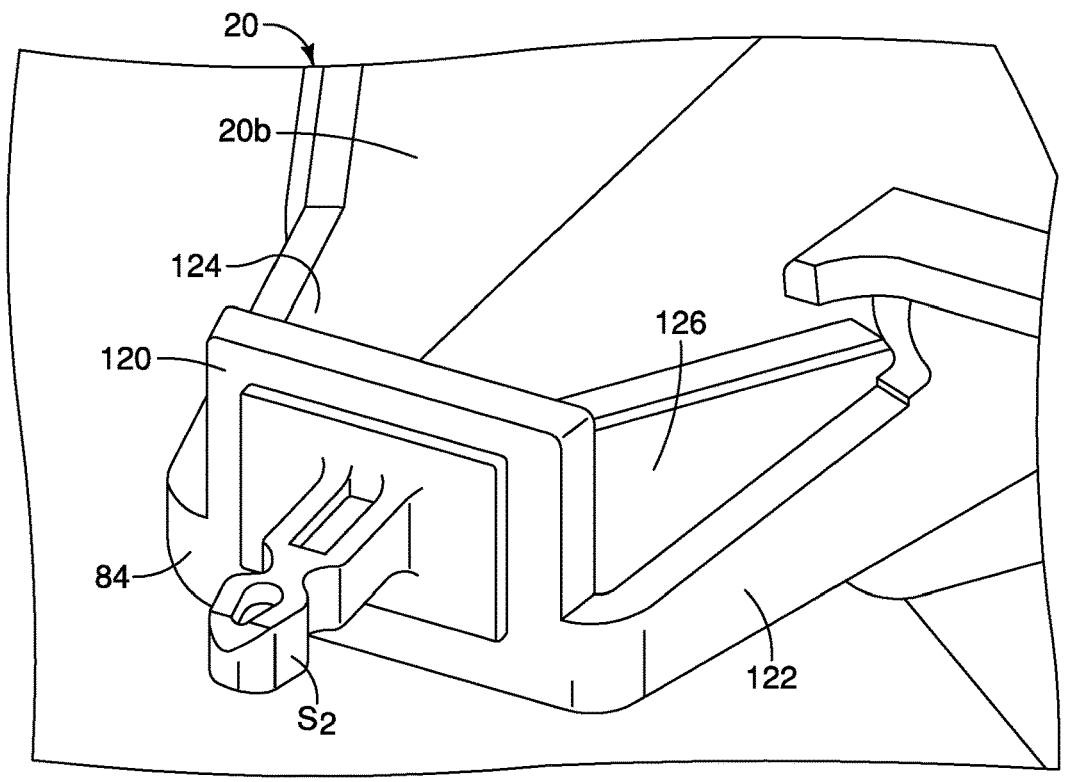
FIG. 17 is a rear perspective view of the second doghouse structure extending rearward from the bumper fascia with a snap fitting fastener installed to the second doghouse structure in accordance with the first embodiment.
Figure 18:
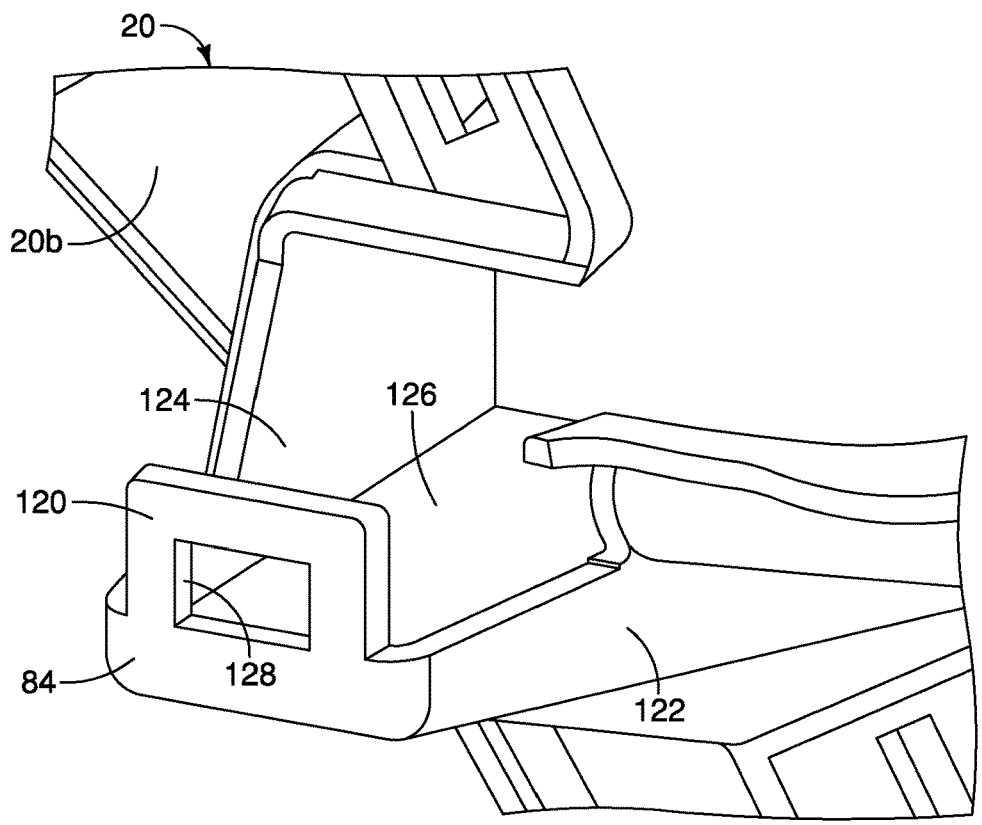
FIG. 18 is another rear perspective view of the second doghouse structure similar to FIG. 17 with the snap fitting fastener removed from the second doghouse structure in accordance with the first embodiment.
Figure 19:
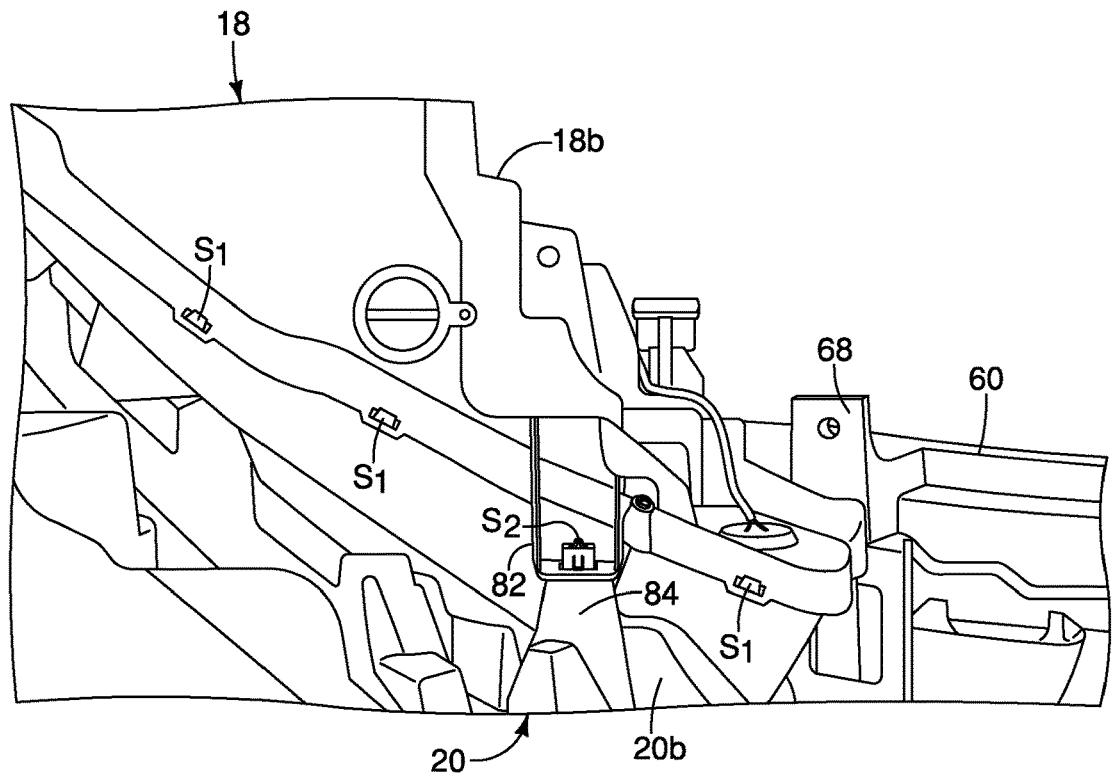
FIG. 19 is a bottom view (looking upward) of the headlamp structure and an outboard area of the bumper fascia showing the snap fitting fastener installed to the second doghouse structure and inserted into the first doghouse structure thereby attaching the first doghouse (the headlamp structure) to the second doghouse (the bumper fascia) together in accordance with the first embodiment.
Figure 20:
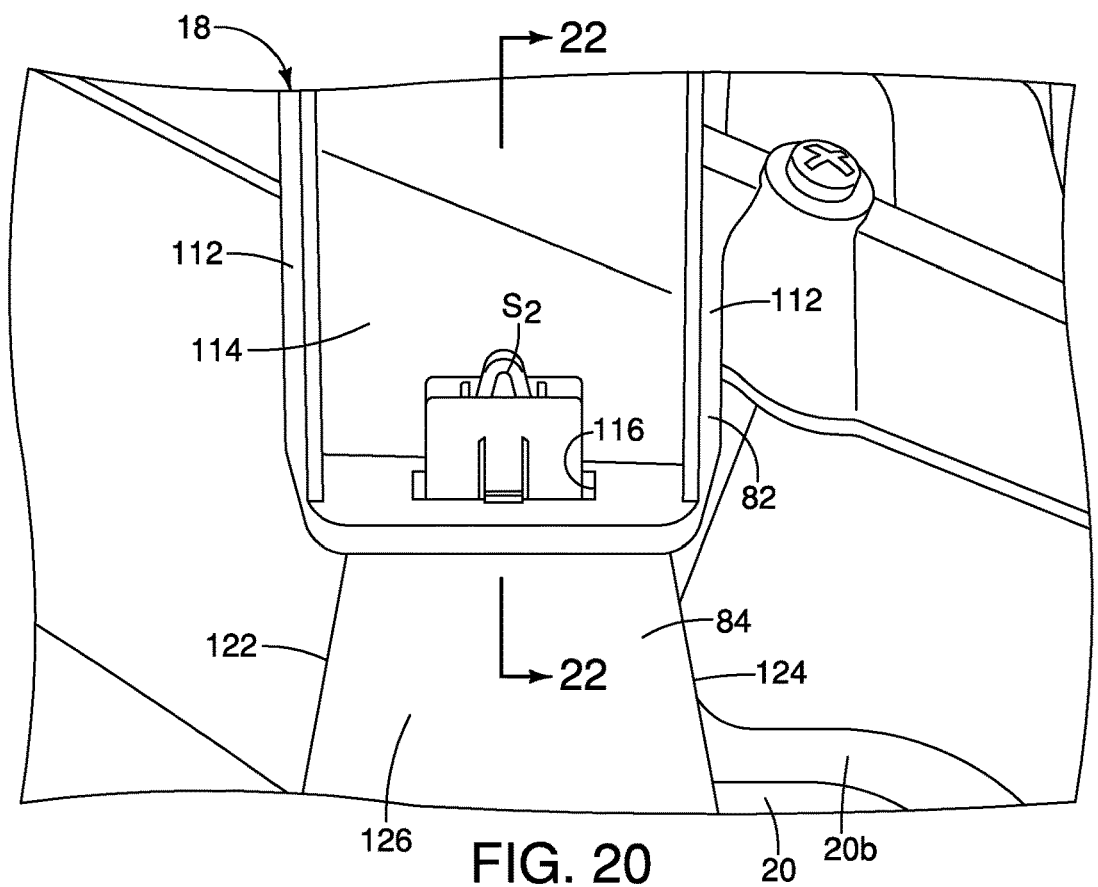
FIG. 20 is another bottom view (looking upward) of the headlamp structure and the outboard area of the bumper fascia showing the snap fitting fastener installed to the second doghouse structure and inserted into the first doghouse structure thereby attaching the first doghouse to the second doghouse together in accordance with the first embodiment.

As shown in FIGS. 16-20 and 22, the second doghouse structure 84 (also referred to as a second doghouse 84) includes rear wall portion 120, a first wall portion 122, a second wall portion 124 and a lower wall portion 126. The rear wall portion 120 includes a slot 128, as shown in FIG. 18. As shown in FIGS. 16-17 and 22, the snap-fitting projection S₂ is installed within the slot 128. The first wall portion 122 and second wall portion 124 converge toward one another from the rearward facing surface 20b of the bumper fascia 20 toward the rear wall portion 120 of the second doghouse 84. The rear wall portion 120 is an upright wall defining an upright surface. The rear wall portion 120 is spaced apart from the rearward facing surface 20b of the bumper fascia 20. The upright end surface 120 is at least partially defined between the rearward ends of the first wall portion 124 and the second wall portion 126.

As shown in FIGS. 17 and 18, the first wall 122 extends upward from the lower wall portion 126 along the rear wall portion 120 to a level that is at or below the slot 128. Similarly, the second wall 124 extends upward from the lower wall portion 126 along the rear wall portion 120 to a level that is at or below the slot 128. Consequently, only a lowermost portion of the rear wall portion 120 is connected to the bumper fascia 20. In other words, the upper portions of the rear wall portion 120 along side and above the slot 128 are basically unsupported. The design of the second doghouse 84 is such that the second doghouse 84 is sufficiently strong to support the bumper fascia 20 during normal conventional operation of the vehicle 10.

In response a low speed an impact event where impact forces acting on the bumper fascia 20 are sufficient to damage the bumper fascia 20, the rear wall portion 120 is frangible and can deliberately be broken. The frangible design of the second doghouse 84 is such that in response to a low impact event as described above, only the bumper fascia 20 (and possibly the front grill 60) experiences damage and the headlamp structure 18 remains undamaged.

The first doghouse structure 82 and the second doghouse structure 84 are positioned respectively on the headlamp structure 18 and the bumper fascia 20 such that the align with one another during installation of the bumper fascia 30 and the headlamp structure 18 to the vehicle frame structure 14 and fender 16 of the vehicle 10. Once fully installed, the snap fitting projection S₂ of the second doghouse structure 84 snap fits into the fastener receiving insert 118 of the first doghouse structure 82 thereby providing and additional attachment between the bumper fascia 20 and the other components of the front end assembly 12.

Figure 24:
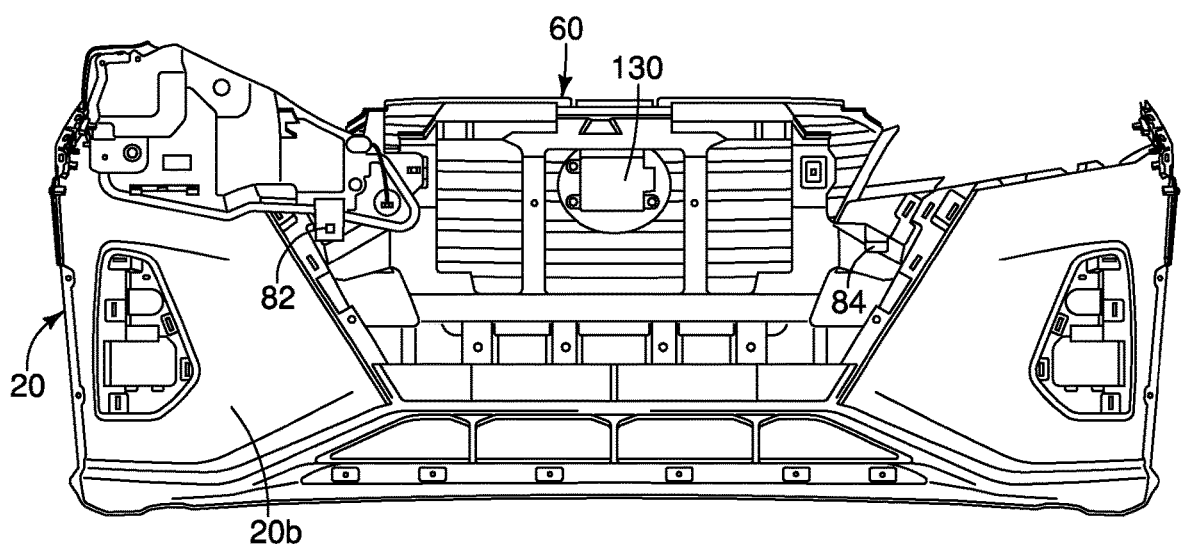
FIG. 24 is a rear view of the front end structure removed from the vehicle showing the location of the first doghouse structure and a radar device installed to the front grill in accordance with the first embodiment.

As shown in FIGS. 2 and 24, a radar component 130 connected to a vehicle electronic controller (not shown) is installed to a rearward facing surface of the front grill 60. The radar component 130 is installed at a location corresponding to an area on a forward facing surface of the front grill 60 where a manufacturer badge is to be installed.

The addition of the first doghouse 82 as part of the headlamp structure 18 and the second doghouse 84 of the bumper fascia 20 provides several benefits to the front end structure 12, as compared to a front end structure 12 that does not include any attachment structures between the bumper fascia 20 and the headlamp structure 18. Further, connection of the first doghouse 82 and the second doghouse 84 provide several benefits as compared to any front end structure that has no connection between a central area of a bumper fascia adjacent to an attached front grill and a corresponding central area of a frame structure of a vehicle.

Those benefits include providing the bumper fascia 20 with an attachment location at a lower end of an inboard section of a headlamp structure 18 adds support to a central area of the bumper fascia 20 and the attached front grill 60. Further, the first doghouse 82 and the second doghouse 84 provide support to the bumper fascia 20 that prevents or at least limits sagging of a central area of a bumper fascia 20 after a low speed impact event.

The first doghouse 82 and the second doghouse 84 provide an attachment structure adjacent to a central area of the bumper fascia 20 giving additional support to the radar component 130 that is installed to a rearward facing surface of the front grill 60 installed to the bumper fascia 20.

As well, the first doghouse 82 and the second doghouse 84 provide an attachment structure adjacent to a central area of the bumper fascia 20 with a frangible wall (the rear wall portion 120) that absorbs low speed impact energy without damaging the adjacent headlamp structure 18.

Second Embodiment

Figure 25:
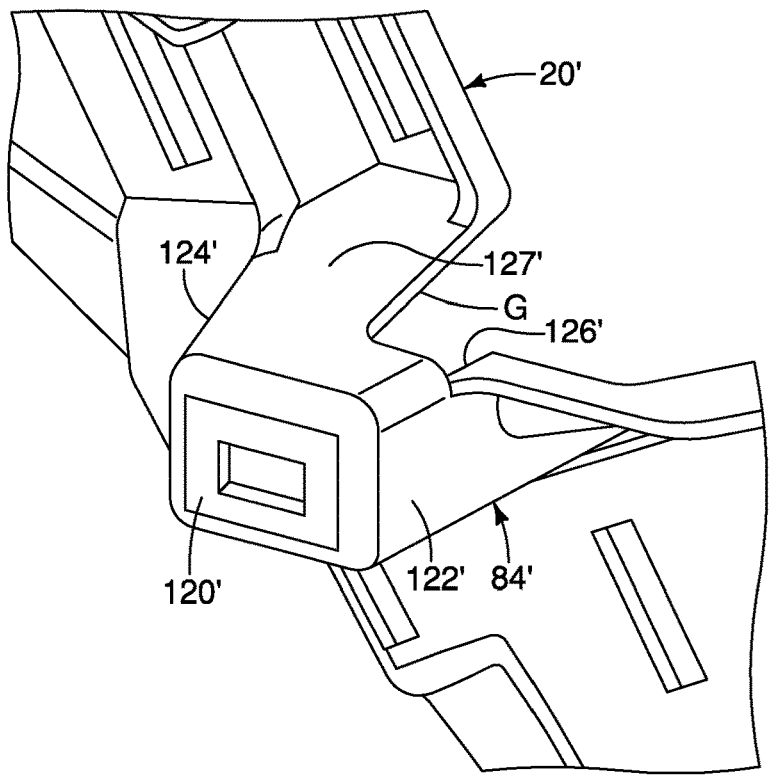
FIG. 25 is a rear perspective view of a second doghouse structure extending rearward from a bumper fascia without a snap fitting fastener installed thereto in accordance with a second embodiment.
Figure 26:
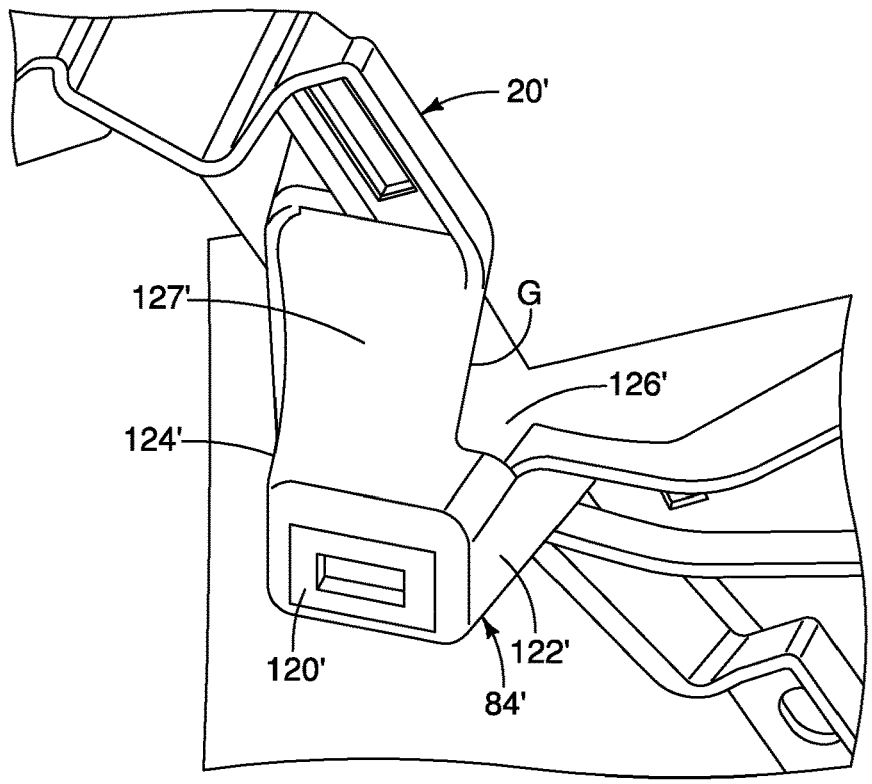
FIG. 26 is another rear perspective view of the second doghouse structure extending rearward from the bumper fascia without a snap fitting fastener installed thereto in accordance with the second embodiment.

Referring now to FIGS. 25 and 26, a bumper fascia 20' with a second doghouse structure 84' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The second doghouse 84' includes rear wall portion 120', a first wall portion 122', a second wall portion 124', a lower wall portion 126' and an upper wall portion 127'. the upper wall portion 127' and the second wall portion 122' are spaced apart from one another forward of the rear wall portion 120'. Consequently, a gap G is defined therebetween. The size of the gap G can be altered depending upon the level of strength desired for the second doghouse 84'. Depending upon the overall design of the vehicle, the strength of the various components at the front end of the vehicle and the flexibility and resilience of the bumper fascia 20', the gap G can be modified accordingly. More specifically, the size of the upper wall portion 127' and the size of the first wall portion 122' can be modified to change the size of the gap G thereby attenuating the frangible characteristics of the second doghouse 84'.

It should be understood from the drawings and the description herein of the second embodiment that the first doghouse structure 82 (not shown in FIGS. 25 and 26) is unchanged.

The various elements and components of the vehicle 10 left out of the written description are conventional components that are well known in the art. Since such elements and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle front end structure. Accordingly, these terms, as utilized to describe the present invention should be interpreted relative to a vehicle equipped with the vehicle front end structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle front end assembly, comprising:
a front portion of a vehicle frame structure;
a bumper fascia attached to the front portion of the vehicle frame structure; and
a headlamp structure having a housing that includes a first doghouse structure that extends below a lower inboard area of the housing, the first doghouse being defined by at least a front wall that has an opening, the first doghouse structure being attached to a second doghouse structure of the bumper fascia such that the headlamp structure is attached to the bumper fascia, and the headlamp structure is also attached to the front portion of the vehicle frame structure,
the second doghouse structure being defined by a lower wall portion, first wall portion, a second wall portion and a rear wall portion having an opening defined therein, the lower wall portion extending rearward from the bumper fascia, the first wall portion and the second wall portion extending upward from opposite sides of the lower wall portion with the rear wall portion extending upward away from the lower wall portions, sections of the rear wall adjacent to and above the opening in the rear wall portion being cantilevered such that the sections of the rear wall portion are spaced apart from the first and second upright walls, with a snap-fitting projection installed in the opening in the rear wall of the second doghouse structure and extending into the opening in the front wall attaching the first doghouse structure to the second doghouse structure and thereby attaching the bumper fascia to the headlamp structure.

2. The vehicle front end assembly according to claim 1, wherein
the headlamp structure is attached to the bumper fascia at a location proximate a lower inboard area of the headlamp structure.

3. The vehicle front end assembly according to claim 2, wherein
the first doghouse structure is further defined by a top wall and two side walls, the top wall extending from a lower portion of the housing, the front wall and two side walls extending downwardly from the top wall such that the first doghouse structure has an open bottom area and open rear area, the first doghouse being at the location proximate the lower inboard area of the headlamp structure.

4. The vehicle front end assembly according to claim 3, wherein
the first wall portion and the second wall portion converge toward one another from the rearward facing surface toward the rear wall portion of the second doghouse.

5. The vehicle front end assembly according to claim 1, wherein the bumper fascia includes a second doghouse structure extends from a rearward facing surface of the bumper fascia and is positioned to align with the first doghouse structure with the bumper fascia attached to the headlamp structure and the front portion of the vehicle frame structure.

6. The vehicle front end assembly according to claim 5, wherein
the rear wall portion of the second doghouse structure is spaced apart from the rearward facing surface of the bumper fascia, the first wall portion and the second wall portion converging toward one another from the rearward facing surface toward the rear wall portion of the second doghouse.

7. The vehicle front end assembly according to claim 1, wherein
the front portion of the vehicle frame structure includes a fender support structure and a radiator support structure, the headlamp structure being fixedly attached to the fender support structure and the radiator support structure.

8. The vehicle front end assembly according to claim 7, wherein
the front grill overlays a central area of a forward facing surface of the bumper fascia, the front grill being attached thereto.

9. The vehicle front end assembly according to claim 8, wherein
the headlamp structure is attached at a first location to an upper portion of the front grill.

10. The vehicle front end assembly according to claim 9, wherein
the headlamp structure is also attached at a second location to an upper portion of the front grill.

11. The vehicle front end assembly according to claim 10, wherein
the first doghouse structure is positioned at the location proximate the lower inboard area of the headlamp structure, and
the second doghouse structure extends from a rearward facing surface of the bumper fascia and is positioned to align with the first doghouse structure and attach thereto thereby attaching the headlamp structure directly to the bumper fascia.

12. The vehicle front end assembly according to claim 11, wherein
the rear wall portion is spaced apart from the rearward facing surface of the bumper fascia, the first wall portion and the second wall portion converge toward one another from the rearward facing surface toward the rear wall portion of the second doghouse.

13. The vehicle front end assembly according to claim 12, wherein
the rear wall portion of the second doghouse structure defines an upright end surface with an attachment opening defined thereon, the upright end surface being at least partially defined between rearward ends of the first and second wall portions.

14. The vehicle front end assembly according to claim 1, wherein
the second doghouse structure is frangible in response to a low speed impact event directed to the bumper fascia.

* * * * *